United States Patent
Tanaka

(10) Patent No.: US 8,771,119 B2
(45) Date of Patent: Jul. 8, 2014

(54) LUBRICANT COMPOSITION FOR CHAINS, AND CHAIN

(75) Inventor: Koji Tanaka, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 75 days.

(21) Appl. No.: 12/744,507

(22) PCT Filed: Sep. 19, 2008

(86) PCT No.: PCT/JP2008/067001
§ 371 (c)(1), (2), (4) Date: May 25, 2010

(87) PCT Pub. No.: WO2009/075131
PCT Pub. Date: Jun. 18, 2009

(65) Prior Publication Data
US 2010/0248879 A1    Sep. 30, 2010

(30) Foreign Application Priority Data
Dec. 12, 2007  (JP) .............................. 2007-321062

(51) Int. Cl.
| | | |
|---|---|---|
| F16G 13/02 | (2006.01) | |
| F16N 7/16 | (2006.01) | |
| C10M 173/00 | (2006.01) | |
| C10M 159/06 | (2006.01) | |

(52) U.S. Cl.
USPC ........... 474/206; 184/15.1; 508/450; 508/451

(58) Field of Classification Search
USPC .............. 474/206, 43, 45, 91; 184/15.1, 15.2, 184/15.3; 508/591, 451, 450
See application file for complete search history.

(56) References Cited

U.S. PATENT DOCUMENTS

| | | | | |
|---|---|---|---|---|
| 2,246,467 A | * | 6/1941 | Kaufman et al. | 508/451 |
| 2,320,002 A | * | 5/1943 | Pool et al. | 508/534 |
| 2,662,058 A | | 12/1953 | McCarthy | |
| 2,836,562 A | * | 5/1958 | Ambrose et al. | 508/439 |
| 3,639,316 A | * | 2/1972 | Argiro | 106/224 |
| 3,856,686 A | * | 12/1974 | Sato et al. | 508/112 |

(Continued)

FOREIGN PATENT DOCUMENTS

| | | |
|---|---|---|
| JP | 55137198 | 10/1980 |
| JP | 5679194 | 6/1981 |

(Continued)

OTHER PUBLICATIONS

JP2006160072_Translation.*

(Continued)

*Primary Examiner* — William E Dondero
*Assistant Examiner* — Minh Truong
(74) *Attorney, Agent, or Firm* — Katten Muchin Rosenman LLP

(57) ABSTRACT

A chain is constructed by alternately connecting a pair of outer link plates connected together with pins and a pair of inner link plates connected together with bushings into which adjacent pins of adjacent pairs of outer link plates are inserted. On the outer and inner surfaces of component parts of the chain, a lubricant composition for chains containing 95% to 80% by mass of a lubricant which is liquid at room temperature and 5% to 20% by mass of a wax which is solid at room temperature and having a consistency of from 60 to 475 and a dropping point of from 60° C. to 120° C., is adhered.

2 Claims, 4 Drawing Sheets

(56) References Cited

U.S. PATENT DOCUMENTS

| | | | |
|---|---|---|---|
| 4,256,591 A * | 3/1981 | Yamamoto et al. | 508/258 |
| 5,019,299 A * | 5/1991 | Kuehnle et al. | 554/1 |
| 5,269,614 A * | 12/1993 | Taylor | 401/9 |
| 5,412,934 A * | 5/1995 | Furuyama | 59/78 |
| 5,472,625 A | 12/1995 | Maples | |
| 5,476,603 A * | 12/1995 | Buchwald et al. | 508/345 |
| 5,529,618 A * | 6/1996 | Buchwald et al. | 106/38.22 |
| 5,631,211 A | 5/1997 | Nakagawa et al. | |
| 5,670,463 A | 9/1997 | Maples | |
| 5,943,855 A * | 8/1999 | Morimoto et al. | 59/5 |
| 6,500,787 B1 | 12/2002 | Tanaka et al. | |
| 6,855,081 B2 * | 2/2005 | Koschig | 474/231 |
| 2006/0142623 A1 | 6/2006 | Yoda et al. | |
| 2010/0292039 A1 * | 11/2010 | Tanaka | 474/232 |

FOREIGN PATENT DOCUMENTS

| | | | | |
|---|---|---|---|---|
| JP | 6323239 | | 5/1988 | |
| JP | 4-153298 | | 5/1992 | |
| JP | 7126679 | | 5/1995 | |
| JP | 8277886 | | 10/1996 | |
| JP | 9268298 | | 10/1997 | |
| JP | 10-505869 | | 6/1998 | |
| JP | 10246230 | | 9/1998 | |
| JP | 11351338 | | 12/1999 | |
| JP | 2000-230186 | | 8/2000 | |
| JP | 2003003185 A * | 1/2003 | | C10M 169/00 |
| JP | 2006-160072 | | 6/2006 | |
| JP | 2006258185 | | 9/2006 | |
| JP | 2007218430 | | 8/2007 | |
| WO | 95/24457 | | 9/1995 | |

OTHER PUBLICATIONS

JP 2003003185A English Translation.*
International Search Report dated Dec. 22, 2008, which was issued for PCT/JP2008/067001.
Supplementary European Search dated Apr. 19, 2011, from corresponding European Application No. 08 85 8437.
Attached is a Japanese Office Action mailed Apr. 24, 2012, from corresponding Japanese Application No. 2007-321062.
European Communication pursuant to Article 94(3) EPC dated Apr. 19, 2013, from corresponding European Application No. 08 858 437.0-1352.

* cited by examiner

LUBRICANT COMPOSITION FOR CHAINS, AND CHAIN

This application is the national phase under 35 U.S.C. §371 of PCT International Application No. PCT/JP2008/067001 which has an International filing date of Sep. 19, 2008 and designated the United States of America.

BACKGROUND

1. Technical Field

The present invention relates to a lubricant composition for chains and to a chain having the lubricant composition for chains adhered to its surface.

2. Description of Related Art

As a power transmission mechanism and a conveyer mechanism, chains such as bushing chains and roller chains are conventionally used. A bushing chain is constructed by alternately connecting a pair of outer link plates, which are connected together with two pins at both ends, and a pair of inner link plates having two bushings at both ends so that the pins on the adjoining sides of two pairs of outer link plates are fitted into the bushings. A roller chain additionally includes rollers fitted on the bushings.

The bushing has a cylindrical shape. There are various types of bushings, such as a roll-type bushing produced by rolling up a rectangular base material cut out from band steel into a cylindrical shape by a forming machine, a seamless-type bushing using a cylindrical member formed by casting and having no seam along a generatrix, and a sintered-type bushing made of a metal sintered body. In the case of roll-type and seamless-type bushings, in order to improve the abrasion resistance property, a lubricant is usually present on the sliding surfaces of the bushings and the pins and on the sliding surfaces of the bushings and the rollers. In the case of a sintered-type bushing, pores of the bushing are impregnated with lubricant oil.

As the lubricant, usually lubricants, which belong to grade No. 10-50 of SAE (Society of Automotive Engineers in the United States of America) viscosity classification (engine oil: equivalent to ISO VG (International Organization for Standardization Viscosity Grades) 22-320) and are liquid at room temperature, are often used.

In the case of a roll-type bushing, a joining section in rolling up the rectangular base material remains as a seam, and therefore when a chain is constructed by inserting pins into the bushings and uses the lubricant, the lubricant flows out through the seam, resulting in a problem that the chain has a short abrasion elongation-resistant life.

In order to reduce an outflow of the lubricant, Japanese Patent Application Laid-Open No. 8-277886 discloses an invention of a bushing having a plurality of blind grooves in the inner circumferential surface. In the case of the bushing of Japanese Patent Application Laid-Open No. 8-277886, however, the lubricant held in the blind grooves tends to flow to the seam because of the influence of centrifugal force applied to the chain, and the lubricant flown out of the blind grooves flows out from the ends in the longitudinal direction of the seam in a short time, resulting in a problem that the lubricant is not held in the bushing for a long period of time, and lubricity and abrasion resistance are not maintained.

Japanese Patent Application Laid-Open No. 2007-218430 discloses a seamless-type bushing having a plurality of blind grooves in the inner circumferential surface. With this bushing, although there is no loss of a lubricant caused by the seam, there is a problem that it is impossible to sufficiently prevent leakage of the lubricant from openings at both ends in the axial direction of the bushing.

In the case of a sintered-type bushing, as described above, by impregnating the pores with a lubricant which is liquid at room temperature and holding the lubricant in the pores, scattering of the lubricant caused by the centrifugal force applied to the chain is prevented. The lubricant is sucked out from the pores of the bushing by a pump function produced by the pin when the pin sways, oozes out because of expansion caused by frictional heat, and forms an oil film in the sliding section between the bushing and the pin. This oil film prevents seizure of the pin. When the swaying motion stops, the lubricant is sucked into the pores again with a lowering in temperature, and therefore the lubricant is required to have fluidity according to the pore diameter so that it is able to enter and leave the pores. Hence, there are problems that the lubricant also tends to flow out and the loss of the lubricant is significant.

As described above, various mechanisms for physically holding lubricants have been studied.

As an invention of a lubricant composition for bearings, Japanese Examined Patent Application Publication No. 63-23239 discloses an invention of a lubricant composition for bearings prepared by mixing ultrahigh molecular weight polyethylene or low molecular weight polyethylene and lubricating grease having a dropping point higher than the melting temperature of the polyethylene. Japanese Patent Application Laid-Open No. 9-268298 discloses an invention of a solid lubricant for bearings prepared by mixing lubricating grease, ultrahigh molecular weight polyolefin, and an oil extravasation inhibitor.

SUMMARY

Unlike a bearing of a shaft of a motor etc. which rotates at high speed, a bushing as a bearing of a chain generally slides on a pin (or a shaft) at low speed under high surface pressure, and the pin sways. In the case of the lubricant compositions of Japanese Examined Patent Application Publication No. 63-23239 and Japanese Patent Application Publication Laid-Open No. 9-268298, since ultrahigh molecular weight polyolefin or low molecular weight polyethylene and lubricating grease having a dropping point higher than the melting temperatures of the olefin and polyethylene are mixed and solidified, when such a lubricant composition is used for a chain, there is a problem that the lubricant is not restored and is scattered to the outside and lost by the chain motion, that is, a large motion like swaying, and abrasion would be increased by the time the sliding heat reaches the temperature at which the lubricant melts.

The present invention has been made with the aim of solving the above problems, and it is an object of the invention to provide a lubricant composition for chains which, when adhered to sliding surfaces, has an appropriate drag force with respect to centrifugal force applied to a chain and fluidity, is prevented from flowing out (being lost), and thereby capable of exhibiting excellent lubricity and abrasion resistance for a long period of time, and to provide the chain.

It is also an object of the invention to provide a lubricant composition for chains which further reduces an outflow, exhibits better lubricity and abrasion resistance and provides a chain with a longer abrasion elongation-resistant life by mixing a polyethylene wax having an average molecular weight of from 900 to 8000 with a paraffin-based mineral oil.

A lubricant composition for chains according to a first aspect of the present invention is characterized by comprising 95% to 80% by mass of a lubricant which is liquid at room temperature and 5% to 20% by mass of a wax which is solid at room temperature, and having a consistency of from 60 to 475 and a dropping point of from 60° C. to 120° C.

Here, room temperature is a temperature of 25° C.

In the present invention, by applying the lubricant composition to the surfaces of a chain, the lubricant composition is present on the sliding surfaces of bushings and pins, and therefore an appropriate drag force with respect to centrifugal force applied to the chain and fluidity are obtained, a loss (outflow) of the lubricant composition due to scattering is reduced, and excellent lubricity and abrasion resistance are exhibited for a long period of time.

According to a second aspect of the present invention, the lubricant composition for chains of the first aspect is characterized by having a consistency of from 95 to 385 and a dropping point of from 77° C. to 120° C.

In the present invention, the consistency and the dropping point of the lubricant composition are more appropriate, and therefore, when the lubricant composition is present on the sliding surfaces, more appropriate drag force and fluidity are obtained, an outflow of the lubricant composition is further reduced, and excellent lubricity and abrasion resistance are exhibited for a longer period of time.

According to a third aspect of the present invention, the lubricant composition for chains of the first or second aspect is characterized in that the lubricant is a paraffin-based mineral oil, and the wax is a polyethylene wax having an average molecular weight of from 900 to 8000.

In the present invention, when the lubricant composition is present on the sliding surfaces, more appropriate drag force and fluidity are obtained and an outflow of the lubricant composition is further reduced, and therefore excellent lubricity and abrasion resistance are exhibited for a longer period of time.

Moreover, it does not take a long time for the lubricant composition to penetrate between the bushings and the pins, and workability is excellent.

A chain according to a fourth aspect of the present invention is a chain constructed by alternately connecting a pair of inner link plates connected together with two bushings and a pair of outer link plates connected together with two pins inserted into adjacent bushings of adjacent pairs of inner link plates, and characterized by having a lubricant composition for chains of any one of the first to third aspects adhered to surfaces of the chain.

In the present invention, since the lubricant composition is present on sliding surfaces, excellent lubricity and abrasion resistance are exhibited during the use of the chain, and the chain has a long abrasion elongation-resistant life.

According to the first or fourth aspect of the present invention, since the lubricant composition is present on sliding surfaces, resistance to centrifugal force applied to the chain and fluidity are obtained, a loss of the lubricant composition due to scattering is reduced, and excellent lubricity and abrasion resistance are exhibited for a long period of time. Thus, the chain has an excellent abrasion elongation-resistant life.

According to the second and third aspects of the present invention, when the lubricant composition is present on sliding surfaces, an outflow of the lubricant composition is further reduced and better lubricity and abrasion resistance are exhibited, and therefore the chain has a longer abrasion elongation-resistant life.

The above and further objects and features will more fully be apparent from the following detailed description with accompanying drawings.

DETAILED DESCRIPTION

The following description will explain specifically the present invention with reference to the drawings illustrating an embodiment thereof.

A lubricant composition for chains (hereinafter just referred to as the lubricant composition) according to the present invention contains 95% to 80% by mass of a lubricant which is liquid at room temperature and 5% to 20% by mass of a wax which is solid at room temperature, and has a consistency of from 60 to 475 and a dropping point of from 60° C. to 120° C.

The consistency is more preferably from 95 to 385, and the dropping point is more preferably from 77° C. to 120° C.

Examples of the lubricant composition include mineral oil, synthetic hydrocarbon (poly-α-olefin: PAO), hindered ester (polyol ester), polyphenyl ether oil, polyalkylene glycol oil, diester oil, phosphoric acid ester oil, silicone oil, silicic acid ester, fluorocarbon, animal and vegetable oil. Among them, mineral oil and hindered ester are preferred.

Examples of the wax include: petroleum waxes such as paraffin wax, microcrystalline wax and petrolatum wax; synthetic waxes such as polyethylene wax and Fischer-Tropsch wax; fat and oil-based synthetic waxes such as fatty acid amide and fatty acid ester; and natural waxes including animal waxes such as beeswax and lanolin, vegetable waxes such as carnauba wax and rice wax, and mineral waxes such as montan wax and ozocerite.

For the lubricant composition of the present invention, in order to provide additional functions, it is possible to add one kind or a combination of two or more kinds of additives, such as an oiliness agent, a rust preventive agent, an antioxidant, an extreme pressure agent, and an anti-foaming agent, according to the need. It is preferable to contain the additive in an amount more than 0% by mass but less than 10% by mass based on the total lubricant composition.

Examples of the oiliness agent are long chain fatty acids, such as stearic acid, oleic acid and their salts.

Examples of the rust-preventive agent are carboxylic acids, carboxylates, sulfonates, and phosphates.

Examples of the anti-oxidant are DBPC (2,6-di-t-butyl-para-cresol), phenyl-α-naphthylamine, zinc diaryl dithiophosphate, and benzotriazole.

Examples of the extreme pressure agent are dialkyl polysulfide, alkyl phosphoric acid ester, and zinc alkyl thiophosphate.

An example of the anti-foaming agent is dimethyl polysiloxane.

Examples of the chain of the present invention include a bushing chain and a roller chain.

EMBODIMENT

The following will explain specifically examples of the present invention and comparative examples, but the present invention is not limited to these examples.

Example 1

Figure 1:
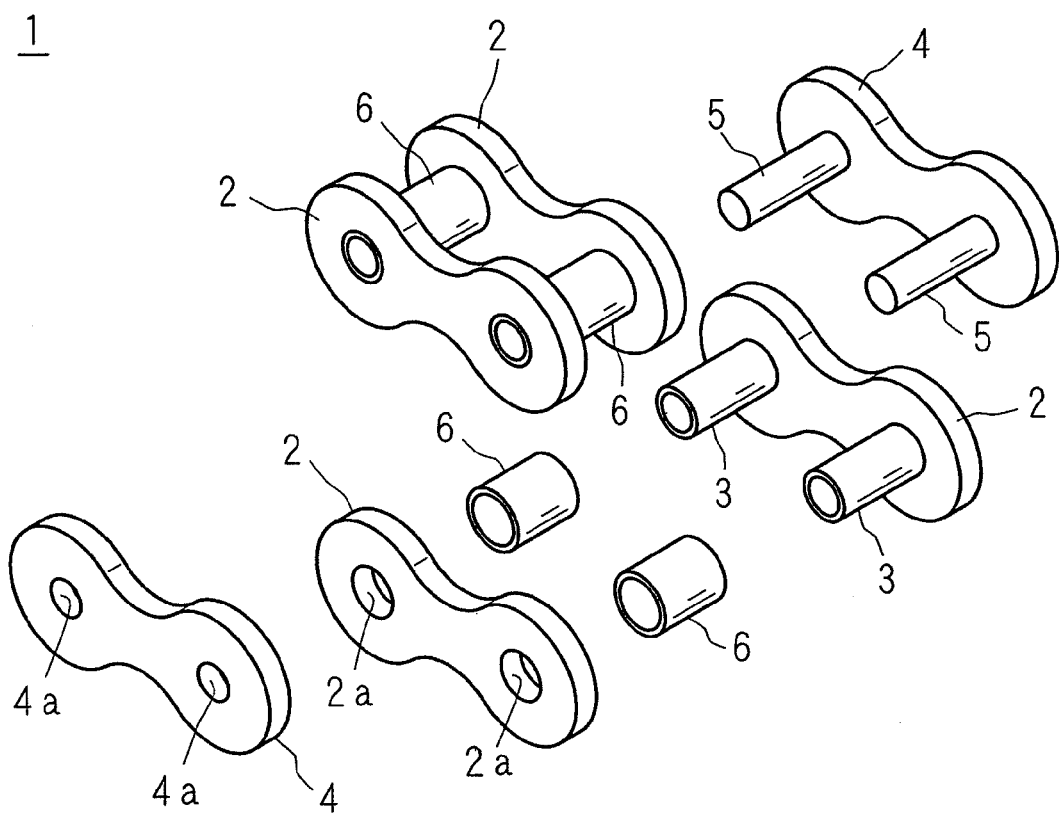
FIG. 1 is a partial perspective view of a roller-chain-type chain according to Example 1 of the present invention.

FIG. 1 is a partial perspective view of a roller-chain-type chain 1 according to Example 1 of the present invention.

Each of inner link plates 2 and outer link plates 4 of the chain 1 has the shape of substantially an eight and is fabricated by forming an arc-shaped dent inwardly in the center of both side edges of a flat plate member in the shape of an ellipse and opening holes 2a, 2a or holes 4a, 4a near both poles of the ellipse. The width of the plate and the diameter of the hole are greater in the inner link plate 2 than in the outer link plate 4. The inner link plates 2 are connected together by interference-fitting one ends of cylindrical bushings 3, 3 into the two holes 2a, 2a of one inner link plate 2 and interference-fitting the other ends of the bushings 3, 3 into the holes 2a, 2a of the other inner link plate 2. Cylindrical rollers 6, 6 with an inner diameter larger than the outer diameter of each of the bushings 3, 3 are fitted rotatably on the bushings 3, 3. In this example, roll-type bushings are used for the bushings 3, 3.

One ends of columnar pins 5, 5 are interference-fitted into the two holes 4a, 4a of one of the outer link plates 4. The pins 5, 5 have a diameter smaller than the inner diameter of the bushings 3, 3 and a length longer than the distance between the inner link plates 2, 2.

In a state in which the pins 5, 5 are inserted into adjacent bushings 3, 3 of inner link plates 2, 2 located next to each other, the other ends of the pins 5, 5 are interference-fitted into the holes 4a, 4a in the other outer link plate 4, thereby connecting the outer link plates 4, 4 and two pairs of the inner link plates 2, 2 together. As described above, by alternately connecting the outer link plates 4, 4 and the inner link plates 2, 2, the chain 1 is constructed.

The size of the chain 1 is equivalent to nominal number 80 of "JIS B1801-1895".

As a lubricant composition to be adhered to the outer and inner surfaces of component parts of the chain 1, 85% by mass of "Diana Fresia P430" (paraffin-based mineral oil having an average molecular weight of 1171: manufactured by Idemitsu Kosan Co. Ltd.) and 15% by mass of "Mitsui Hi-WAX 110P" (polyethylene wax having an average molecular weight of 1000 and a melting point of 109° C. (DSC method): manufactured by Mitsui Chemicals Inc.) were mixed. This mixture was heated above the melting points, and the chain 1 was soaked in the mixture for 5 to 10 minutes to obtain the chain 1 of Example 1 having the lubricant composition adhered to the outer and inner surfaces.

Example 2

A chain of Example 2 was produced in the same manner as in Example 1 except that 15% by mass of "Mitsui Hi-WAX 320P" (polyethylene wax having an average molecular weight of 3000 and a melting point of 109° C. (DSC method): manufactured by Mitsui Chemicals Inc.) was mixed as the wax contained in the lubricant composition.

Example 3

A chain of Example 3 was produced in the same manner as in Example 1 except that 15% by mass of "Mitsui Hi-WAX 720P" (polyethylene wax having an average molecular weight of 7200 and a melting point of 113° C. (DSC method): manufactured by Mitsui Chemicals Inc.) was mixed as the wax contained in the lubricant composition.

Example 4

A chain of Example 4 was produced in the same manner as in Example 1 except that 85% by mass of "Cosmo Neutral 150" (paraffin-based mineral oil having an average molecular weight of 410: manufactured by Cosmo Oil Lubricants Co. Ltd.) and 15% by mass of the above-mentioned "Mitsui Hi-WAX 320P" were mixed as the lubricant composition.

Example 5

A chain of Example 5 was produced in the same manner as in Example 4 except that 15% by mass of the above-mentioned "Mitsui Hi-WAX 720P" was mixed as the wax contained in the lubricant composition.

Example 6

A chain of Example 6 was produced in the same manner as in Example 1 except that 85% by mass of "Cosmo Neutral 500" (paraffin-based mineral oil having an average molecular weight of 521: manufactured by Cosmo Oil Lubricants Co. Ltd.) and 15% by mass of the above-mentioned "Mitsui Hi-WAX 320P" were mixed as the lubricant composition.

Example 7

A chain of Example 7 was produced in the same manner as in Example 6 except that 15% by mass of the above-mentioned "Mitsui Hi-WAX 720P" was mixed as the wax contained in the lubricant composition.

Example 8

A chain of Example 8 was produced in the same manner as in Example 1 except that 5% by mass of "Mitsui Hi-WAX 800P" (polyethylene wax having an average molecular weight of 8000 and a melting point of 127° C. (DSC method): manufactured by Mitsui Chemicals Inc.) and 10% by mass of "Mitsui Hi-WAX 320P" were mixed as the wax contained in the lubricant composition.

Example 9

A chain of Example 9 was produced in the same manner as in Example 1 except that 10% by mass of the above-mentioned "Mitsui Hi-WAX 800P" and 5% by mass of "Mitsui Hi-WAX 320P" were mixed as the wax contained in the lubricant composition.

Example 10

A chain of Example 10 was produced in the same manner as in Example 1 except that 93% by mass of the above-mentioned "Diana Fresia P430" and 7% by mass of "Mitsui Hi-WAX 220P" (polyethylene wax having an average molecular weight of 2000 and a melting point of 110° C. (DSC method): manufactured by Mitsui Chemicals Inc.) were mixed as the lubricant composition.

Example 11

A chain of Example 11 was produced in the same manner as in Example 1 except that 90% by mass of "Diana Fresia P430" and 10% by mass of "Mitsui Hi-WAX 220P" were mixed as the lubricant composition.

Example 12

A chain of Example 12 was produced in the same manner as in Example 1 except that 85% by mass of "Diana Fresia P430" and 15% by mass of "Mitsui Hi-WAX 220P" were mixed as the lubricant composition.

Example 13

A chain of Example 13 was produced in the same manner as in Example 1 except that 80% by mass of "Diana Fresia P430" and 20% by mass of "Mitsui Hi-WAX 220P" were mixed as the lubricant composition.

Example 14

A chain of Example 14 was produced in the same manner as in Example 1 except that 90% by mass of a hindered ester and 10% by mass of "Mitsui Hi-WAX 220P" were mixed as the lubricant composition.

Example 15

A chain of Example 15 was produced in the same manner as in Example 1 except that 90% by mass of bright stock oil equivalent to "Diana Fresia P430" and 10% by mass of "HNP-10" (paraffin wax having an average molecular weight of 592 and a melting point of 75° C.: manufactured by Nippon Seiro Co. Ltd.) were mixed as the lubricant composition.

Comparative Example 1

A chain of Comparative Example 1 was produced in the same manner as in Example 1 except that the above-mentioned "Cosmo Neutral 150" was used without wax.

Comparative Example 2

A chain of Comparative Example 2 was produced in the same manner as in Example 1 except that the above-mentioned "Cosmo Neutral 500" was used without wax.

Comparative Example 3

A chain of Comparative Example 3 was produced in the same manner as in Example 1 except that the above-mentioned "Diana Fresia P430" was used without wax.

Comparative Example 4

A chain of Comparative Example 4 was produced in the same manner as in Example 1 except that 90% by mass of "Diana Fresia P430" and 10% by mass of stearic acid amide were mixed as the lubricant composition.

Comparative Example 5

A chain of Comparative Example 5 was produced in the same manner as in Example 1 except that 15% by mass of "Mitsui Hi-WAX 800P" was mixed as the wax contained in the lubricant composition.

Comparative Example 6

A chain of Comparative Example 6 was produced in the same manner as in Example 1 except that 96.5% by mass of the above-mentioned "Diana Fresia P430" and 3.5% by mass of "Mitsui Hi-WAX 220P" were mixed as the lubricant composition.

The consistency and dropping point of each of the lubricant compositions of Examples 1 to 15 and Comparative Examples 4 to 6 were measured. The results are shown in Table 1 below. According to the consistency measurement methods for "petroleum waxes (JIS K 2235)" and "greases (JIS K 2220)", the consistency was measured by heating each lubricant composition to 125° C. and cooling it to 25° C. and measuring the depth to which a specified cone penetrated the sample.

The dropping point was measured according to the dropping point measurement method for "greases (JIS K 2220)"

TABLE 1

Figure 2:
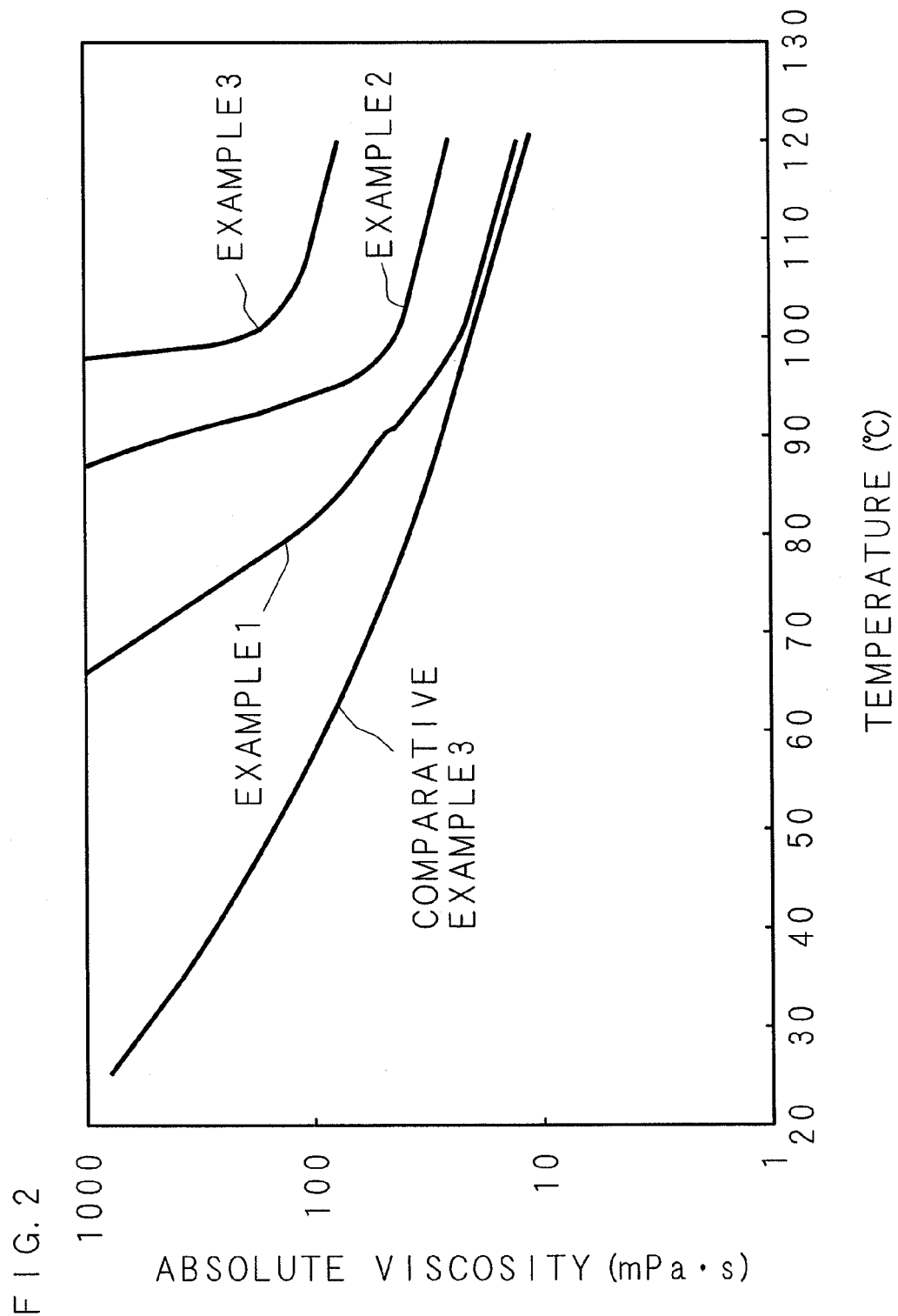
FIG. 2 is a graph indicating the results of studying the relationship between temperature and absolute viscosity of lubricant compositions of Examples 1 to 3 and Comparative Example 1.
Figure 3:
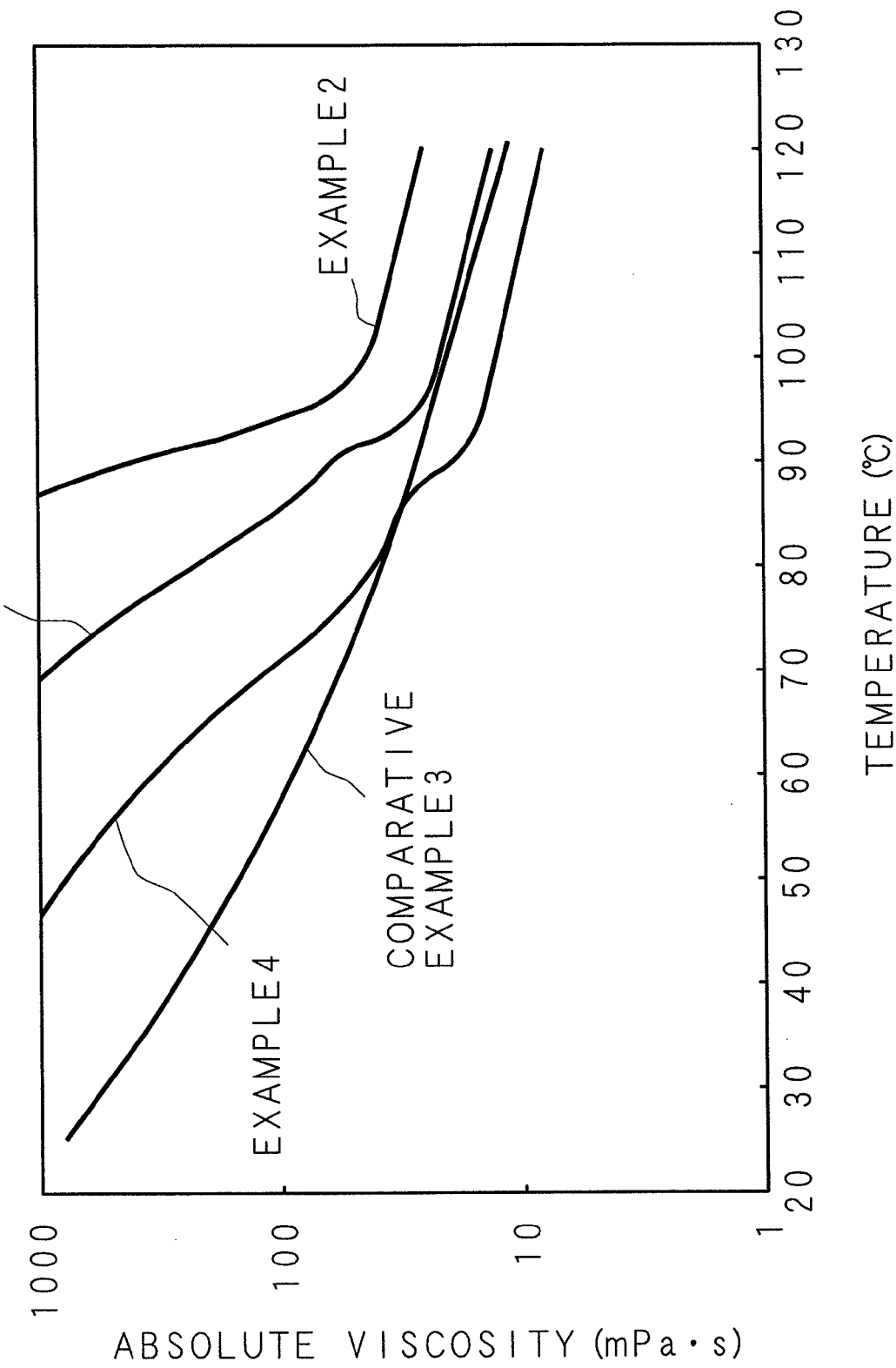
FIG. 3 is a graph indicating the results of studying the relationship between temperature and absolute viscosity of lubricant compositions of Examples 2, 4, 6 and Comparative Example 3.

| | AVERAGE MOLECULAR WEIGHT | CONSISTENCY | DROPPING POINT | ABSOLUTE VISCOSITY OR KINEMATIC VISCOSITY | ABRASION ELONGATION TIME h |
|---|---|---|---|---|---|
| EXAMPLE1 | | 182 | 96.5 | CF. FIG. 2 | 85 |
| EXAMPLE2 | | 160 | 101.8 | CF. FIG. 2, FIG. 3 | 160 |
| EXAMPLE3 | | 63 | 102.8 | CF. FIG. 2 | 167 |
| EXAMPLE4 | | 251 | 91.7 | CF. FIG. 3 | 58 |
| EXAMPLE5 | | 167 | 92.2 | | 60 |
| EXAMPLE6 | | 210 | 97.0 | CF. FIG. 3 | 80 |
| EXAMPLE7 | | 102 | 96.6 | | 95 |
| EXAMPLE8 | | 100 | 117.7 | | 127 |
| EXAMPLE9 | | 95 | 119.3 | | 145 |
| EXAMPLE10 | | 385 | 85.5 | | 74 |
| EXAMPLE11 | | 295 | 91.5 | | 76 |
| EXAMPLE12 | | 210 | 94.9 | | 119 |
| EXAMPLE13 | | 156 | 98.5 | | 102 |
| EXAMPLE14 | | 134 | 101.4 | | 71 |
| EXAMPLE15 | | 178 | 61.0 | | 60 |
| COMPARATIVE EXAMPLE1 | 410 | | | 32.96 | |
| COMPARATIVE EXAMPLE2 | 521 | | | 99.67 | |
| COMPARATIVE EXAMPLE3 | 1171 | | | 419 | 36 |
| COMPARATIVE EXAMPLE4 | | 230 | 132.8 | | 59 NOTE |

TABLE 1-continued

| | AVERAGE MOLECULAR WEIGHT | CONSISTENCY | DROPPING POINT | ABSOLUTE VISCOSITY OR KINEMATIC VISCOSITY | ABRASION ELONGATION TIME h |
|---|---|---|---|---|---|
| COMPARATIVE EXAMPLE5 | | INCAPABLE MEASUREMENT | 120.0 | | 155 NOTE |
| COMPARATIVE EXAMPLE6 | | INCAPABLE MEASUREMENT | 66.3 | | |

The graph of FIG. 2 indicates the results of studying the relationship between temperature and absolute viscosity of the lubricant compositions of Examples 1 to 3 and Comparative Example 3, and the graph of FIG. 3 shows the results of studying the relationship between temperature and absolute viscosity of the lubricant compositions of Examples 4, 6 and Comparative Example 3. The measurement results of Example 2 are also shown in FIG. 3.

The absolute viscosity was measured using a tuning-fork vibration viscometer after heating each lubricant composition to 120° C. and cooling it naturally.

For the lubricant compositions of Comparative Examples 1 to 3, the kinematic viscosity (mm²/s) at 40° C. was measured. The results are indicated in Table 1 above.

In order to evaluate the abrasion elongation-resistant life of each of the chains of Examples 1 to 15 and Comparative Examples 3 to 5, the following property evaluation tests were conducted.

Each chain was wound around two sprockets (the number of teeth: 17T) endlessly and rotated 650 times per minute while applying a load (surface pressure: 1.27 kN/cm², sliding speed: 16.2 m/min) from the center of one of the sprockets in a direction opposite to the direction heading the other sprocket, and the running time until the abrasion-elongation amount of each chain reached 1.0% was measured. The results are indicated in Table 1 above.

When there was no lubricant adhered to the outer and inner surfaces of the chain, the abrasion-elongation time is substantially 20 hours. For Comparative Examples 1 and 2, since it was confirmed that the lubricant compositions were almost lost in 5 hours or 10 hours after starting the tests, estimated abrasion-elongation times are 28 hours and 33 hours which are slightly longer than a time calculated by adding the time in which each lubricant composition is almost lost to the 20 hours. For Comparative Example 6, although the above test was not carried out, it is estimated that the abrasion-elongation time is much less than about 60 hours because the lubricant composition is too soft to measure the consistency and tends to flow out.

By comparing Examples 1 to 15 and Comparative Examples 1 to 3 and 6, it is understood that the chains of Examples 1 to 15 having the lubricant compositions adhered to the outer and inner surfaces, each lubricant composition containing 95% to 80% by mass of a lubricant which is liquid at room temperature and 5% to 20% by mass of a wax which is solid at room temperature and having a consistency of from 60 to 475 and a dropping point of from 60° to 120° C., have a abrasion-elongation time exceeding 58 hours and longer abrasion resistant lives.

This is because that when the lubricant compositions of Examples 1 to 15 are present on the sliding surfaces, appropriate drag force with respect to centrifugal force applied to the chain and fluidity are obtained, the loss of the lubricant compositions due to scattering is reduced, and excellent lubricity and abrasion resistance are exhibited for a long period of time.

The dropping points of the lubricant compositions of Examples 1 to 15 are lower than the melting temperatures (melting points) of the lubricant compositions, and the lubricant compositions have adequate fluidity before they reach the melting temperatures, and exhibit lubricity without loss.

In the chains of this embodiment, since the lubricant compositions of this embodiment are adhered to all surfaces, the chains have excellent lubricity and abrasion resistance and excellent rust preventive property.

In Table 1 and FIG. 2, by comparing Examples 1 to 3 and Comparative Example 3, it is understood that Examples 1 to 3 have longer abrasion-elongation time than Comparative Example 3 containing no wax. It is also understood that when the same types of lubricants and waxes were used and the same amounts of the lubricants and the waxes were contained, the higher the molecular weight of the wax, the higher the absolute viscosity and the dropping point, and the longer the time it takes for the chain to reach the abrasion-elongation state (the abrasion-elongation time) when the lubricant composition is adhered to the sliding surfaces of the chain.

As indicated in Table 1, Comparative Examples 4 and 5 have excellent abrasion-elongation times, 59 hours and 155 hours, respectively. However, in Comparative Example 4, the dropping point of the lubricant composition is 132.8° C., and in Comparative Example 5, the lubricant composition containing 15% by mass of a wax having an average molecular weight of 8000 is so hard that the consistency is not measurable and has a high dropping point of 120° C., and therefore it takes a long time for the lubricant compositions to penetrate between the bushings and the pins, resulting in bad workability. Moreover, since the temperature during the process of soaking the chain is high, the lubricant compositions are likely deteriorated by heat. Further, when using such a chain, since the bending resistance of the chain is higher and the chain is hard to be bent, there is a problem that the chain is not suitable for actual use. Hence, a lubricant composition with a dropping point of 120° or less is used. As the wax, it is preferable to use a polyethylene wax with an average molecular weight of less than 8000.

In the case when "Mitsui Hi-WAX 800P" with an average molecular weight of 8000 is used, if it is mixed with "Mitsui Hi-WAX 320P" having an average molecular weight of 3000 as in the lubricant compositions of Examples 8 and 9, the obtained lubricant composition has enough softness to enable a measurement of consistency, easily penetrates between the bushings and the pins, and provides excellent workability. Further, the abrasion-elongation time is longer, and the abrasion resistant life is longer.

It is understood by comparing Examples 4 and 5 and comparing Examples 6 and 7 that when the same types of lubricant and wax were used and the same amounts of the lubricant and wax were contained, the higher the average molecular weight of the wax, the longer the abrasion-elongation time, when the lubricant composition is adhered to the sliding surfaces of the chain.

In Table 1 and FIG. 3, by comparing Examples 2, 4 and 6, it is understood that when the same wax was used and the same amounts of the lubricant and wax were contained, the higher the molecular weight of the lubricant, the higher the absolute viscosity and the dropping point, and the longer the abrasion-elongation time when the lubricant composition is adhered to the sliding surfaces of the chain.

Figure 4:
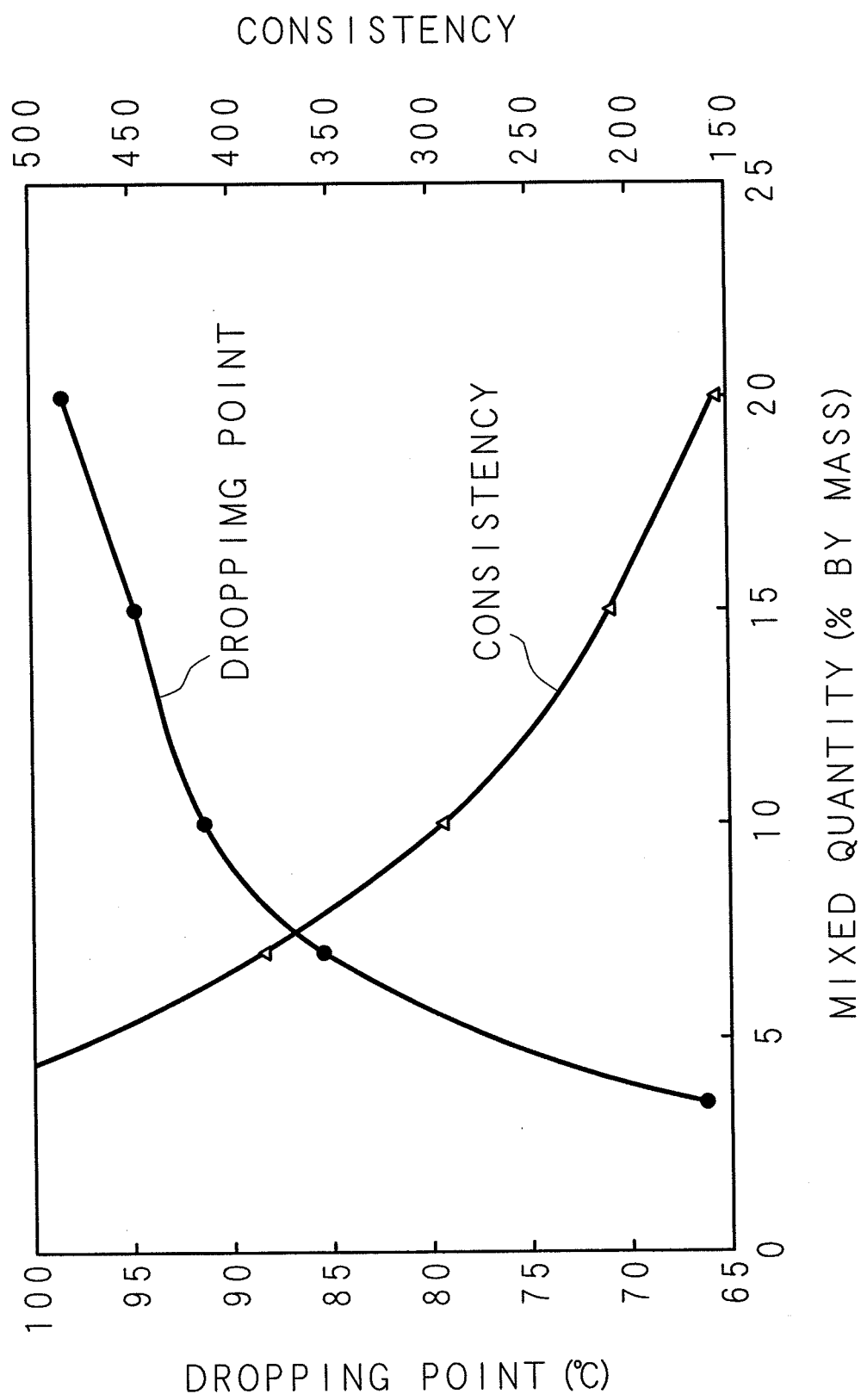
FIG. 4 is a graph indicating the relationship among the amount of wax, dropping point and consistency.

FIG. 4 is a graph indicating the relationship among the amount of wax, dropping point and consistency on the basis of results of analyzing the characteristics of Examples 10 to 13 and Comparative Example 6.

It is understood by comparing the property evaluation results of Examples 10 to 13 and Comparative Example 6 in FIG. 4 and Table 1 that the higher the amount of the wax, the smaller the consistency, that is, the higher the hardness, and the higher the dropping point, and, generally, the longer the abrasion-elongation time when the lubricant composition is adhered to the sliding surfaces of the chain.

When the mass percent of the wax exceeds 20, the cost of the lubricant composition is increased.

When the mass percent of the wax is less than 5, the lubricant composition becomes so soft that the consistency is not measurable, and easily flows out, and the abrasion-elongation time becomes shorter. Therefore, the lubricant composition contains a wax from 5% by mass to 20% by mass.

In Table 1, it is understood by comparing Examples 11 and 14 that, when the same wax was mixed, Example 11 containing a paraffin-based mineral oil as the lubricant has a longer abrasion-elongation time than Example 14 containing a hindered ester.

It is also understood that Example 15 containing a mixture of a bright stock oil equivalent to "Diana Fresia P430" as the lubricant and a paraffin wax as the wax has a shorter abrasion-elongation time than Example 11 containing a polyethylene wax.

It is understood from Table 1 and FIG. 4 that when the dropping point is equal to or higher than 60° C., the outflow of the lubricant composition is reduced, and therefore the abrasion-elongation time exceeds about 60 hours. When the dropping point is higher than 120° C., since the workability deteriorates as in Comparative Example 4 mentioned above, the dropping point needs to be 120° C. or less.

When the lubricant composition is too soft, the lubricant composition is lost because it flows out in sliding, whereas when the lubricant composition is too hard, it takes a longer time for the lubricant composition to penetrate between the bushings and the pins, and the workability deteriorates as in Comparative Example 5. Therefore, the consistency is preferably from 60 to 475, and more preferably from 95 to 385.

It is understood from Table 1 that when the consistency is higher, that is, when the lubricant composition is softer, it is possible to control the abrasion-elongation time to be longer by designing the dropping point to be higher.

Although the above embodiment explains a case where a lubricant composition according to the present invention is adhered to the outer and inner surfaces of the chain 1 by soaking the chain 1 in the lubricant composition, the present invention is not limited to this, and the lubricant composition may be adhered to the chain surfaces by coating.

Moreover, although the above embodiment explains a case where a lubricant composition according to the present invention is adhered to the surfaces of the chain 1 having roll-type bushings 3, the present invention is not limited to this, and the lubricant composition may be adhered to chains having seamless-type bushings, or bushings with blind grooves in the inner circumferential surface.

Further, the chain is not limited to roller chain type, and may be of bushing chain type.

INDUSTRIAL APPLICABILITY

The present invention is applicable to types of chains, such as bushing chains and roller chains, for use in a power transmission mechanism and a conveyer mechanism.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

The invention claimed is:

1. A chain comprising:
   alternately connected inner link plate pairs and outer link plate pairs, each pair of inner link plates being connected together with two bushings, each pair of outer link plates being connected together with two pins inserted into adjacent bushings of adjacent pairs of inner link plates,
   wherein said chain has a lubricant composition adhered to surfaces of said chain,
   wherein the lubricant composition comprising
      a paraffin-based mineral oil comprising 95% to 80% by mass of the lubricant composition, the paraffin-based mineral oil being a liquid at room temperature; and
      a wax comprising 5% to 20% by mass of the lubricant composition, the wax being solid at room temperature and consisting of
         a first polyethylene wax having an average molecular weight in a range of 1000 to 8000, or
         a mixture of a second polyethylene wax having an average molecular weight of 3000 and a third polyethylene wax having an average molecular weight of 8000;
      wherein a penetration of the lubricant composition is in a range from 63 to 210 and a dropping point of the lubricant composition is in a range from 94° C. to 120° C., the penetration being obtained by measuring a depth to which a specified cone penetrates the lubricant composition according to the penetration measurement method for "greases (JIS K 2220)."

2. A lubricant composition for chains, the lubricant composition comprising:
   a paraffin-based mineral oil comprising 95% to 80% by mass of the lubricant composition, the paraffin-based mineral oil being a liquid at room temperature; and
   a wax comprising 5% to 20% by mass of the lubricant composition, the wax being solid at room temperature and consisting of
      a first polyethylene wax having an average molecular weight in a range of 1000 to 8000, or
      a mixture of a second polyethylene wax having an average molecular weight of 3000 and a third polyethylene wax having an average molecular weight of 8000;
   wherein a penetration of the lubricant composition is in a range from 63 to 210 and a dropping point of the lubricant composition is in a range from 94° C. to 120° C., the penetration being obtained by measuring a depth to which a specified cone penetrates the lubricant composition according to the penetration measurement method for "greases (JIS K 2220)."

* * * * *